United States Patent
Zanka et al.

(10) Patent No.: US 6,403,691 B1
(45) Date of Patent: Jun. 11, 2002

(54) HIGH-CONCENTRATION TALC MASTERBATCH

(75) Inventors: Yukihito Zanka; Yoshihiro Banno, both of Mie (JP)

(73) Assignee: Japan Polychem Corporation, Tokyo (JP)

( * ) Notice: Subject to any disclaimer, the term of this patent is extended or adjusted under 35 U.S.C. 154(b) by 0 days.

(21) Appl. No.: 09/531,448

(22) Filed: Mar. 20, 2000

(30) Foreign Application Priority Data

Mar. 19, 1999 (JP) .......................................... 11-075093

(51) Int. Cl.⁷ ................................................. C08K 3/34
(52) U.S. Cl. ...................................... 524/451; 523/351
(58) Field of Search ........................... 524/451; 525/88, 525/90, 240, 451; 523/351

(56) References Cited

U.S. PATENT DOCUMENTS

| | | | | |
|---|---|---|---|---|
| 4,229,504 A | * | 10/1980 | Brachman | ................... 428/461 |
| 5,039,525 A | * | 8/1991 | Tamashima et al. | ......... 524/423 |
| 5,302,653 A | * | 4/1994 | Nishio et al. | ................ 524/451 |
| 5,747,576 A | * | 5/1998 | Sobajima et al. | ............ 524/451 |
| 5,777,020 A | * | 7/1998 | Nagai et al. | ................. 524/451 |
| 5,792,807 A | * | 8/1998 | Hayashihara et al. | ........ 524/425 |
| 5,965,654 A | * | 10/1999 | Hirata et al. | ................. 524/451 |
| 6,180,709 B1 | * | 1/2001 | Nishio et al. | ................ 524/451 |

* cited by examiner

*Primary Examiner*—Edward J. Cain
*Assistant Examiner*—Katarzyna W. Lee
(74) *Attorney, Agent, or Firm*—Oblon, Spivak, McClelland, Maier & Neustadt, P.C.

(57) ABSTRACT

Disclosed is a high-concentration talc masterbatch comprising: (A) 10 to 60 parts by weight of an elastomer having a melt flow rate of from 0.5 to 150 g/10 min; (B) 40 to 90 parts by weight of talc having an average particle diameter of from 1 to 15 $\mu$m; and (C) 0.01 to 5 parts by weight of a metal soap, based on 100 parts by weight of the sum of the ingredients (A) and (B).

13 Claims, No Drawings

HIGH-CONCENTRATION TALC MASTERBATCH

BACKGROUND OF THE INVENTION

1. Field of the Invention

The present invention relates to a high-concentration talc masterbatch. More particularly, the invention relates to a masterbatch that, when blended with a polypropylene resin, is capable of providing a thermoplastic resin composition suitable for injection molding.

2. Description of the Related Art

Because of their excellent property balance and moldability, polypropylene-based composite materials containing an inorganic filler, e.g., talc, and/or an elastomer are extensively used in recent years as automotive parts such as, e.g., bumpers, instrument panels, door trims, and pillar trims and as industrial parts such as, e.g., parts for domestic electrical appliances. On the other hand, since these ingredients are generally compounded by resin manufactures before being supplied as a composite material to molding manufacturers, even slight modifications of mold designs necessitate a composite material of a new grade having a modified makeup. There has hence been a problem that this constitutes a serious obstacle to grade integration.

Techniques for overcoming these drawbacks have been proposed. For example, JP-A-63-165439 (the term "JP-A" as used herein means an "unexamined published Japanese patent application") proposes a technique in which a high-concentration talc masterbatch, a pigment masterbatch, and a polypropylene resin are metered and premixed together before being molded. JP-A-9-25447 proposes a technique in which a high-concentration talc masterbatch serving also as a color masterbatch is used. However, in these references, there is no description concerning mechanical properties. Furthermore, these techniques have a drawback that the masterbatches, which employ a polypropylene resin as a matrix resin, are less effective in reducing the degree of shrinkage and, hence, need to be used in a large amount. Consequently, further improvements are presently desired.

SUMMARY OF THE INVENTION

An object of the invention is to provide a high-concentration talc masterbatch which efficiently reduces the degree of molding shrinkage and the degree of thermal shrinkage and brings about satisfactory properties merely when it is melt-kneaded together with a base material within an injection molding machine.

The present inventors made intensive studies in order to eliminate the problems described above. As a result, they have found that a high-concentration masterbatch which gives moldings having a satisfactory appearance, can efficiently control the degree of shrinkage, and is suitable for grade integration can be obtained by incorporating a specific amount of a talc ingredient having a specific particle diameter and a specific amount of a metal soap ingredient into an elastomer ingredient having specific flowability. The invention has been completed based on this finding.

The invention provides a high-concentration talc masterbatch obtained by kneading the following ingredients (A) to (C) together and granulating the mixture:

(A) an elastomer having a melt flow rate of from 0.5 to 150 g/10 min: 10 to 60 parts by weight,
(B) talc having an average particle diameter of from 1 to 15 μm: 40 to 90 parts by weight,
(C) a metal soap: 0.01 to 5 parts by weight per 100 parts by weight of the sum of (A) and (B).

The high-concentration talc masterbatch of the invention is preferably one wherein the metal soap is a compound represented by the formula $(RCOO)_n X$ wherein R is a hydrocarbon residue having 10 to 40 carbon atoms; X is a metal selected from Li, Na, K, Mg, Zn, Ca, Ba, and Al; and n is 1, 2, or 3.

Furthermore, the high-concentration talc masterbatch of the invention is preferably one wherein the coefficient of decrease in shrinkage degree (K) per part by weight of the masterbatch (MB) added per 100 parts by weight of a base material is 1/10,000 or higher and the coefficient of change in flexural modulus (L) per part by weight of the masterbatch (MB) added per 100 parts by weight of the base material is −50 or higher, the coefficients K and L being respectively determined by the following equations:

$K$=(decrease in shrinkage degree)/(MB addition amount, parts by weight)

$L$=[(flexural modulus after MB addition)−(flexural modulus before MB addition)]/(MB addition amount, parts by weight).

DETAILED DESCRIPTION OF THE INVENTION

[I] Constituent Ingredients

1. Elastomer (Ingredient (A))

(1) Elastomer Ingredient

The elastomer ingredient for use in the high-concentration talc masterbatch of the invention is used for the purposes of efficiently reducing the degree of shrinkage and bringing about a satisfactory appearance while maintaining or improving impact resistance.

Examples of the elastomer ingredient for use in the invention include ethylene/α-olefin copolymer rubbers such as ethylenepropylene copolymer rubbers, ethylene/1-butene copolymer rubbers, ethylene/1-hexene copolymer rubbers, and ethylene/1-octene copolymer rubbers; ethylene/α-olefin/unconjugated diene copolymer rubbers such as ethylene/propylene/ethylidenenorbornene copolymer rubbers (EPDM); and hydrogenated block copolymer rubbers such as hydrogenated styrene/butadiene/styrene triblock copolymers (SEBS) and hydrogenated styrene/isoprene/styrene triblock copolymers (SEPS).

(2) Production of Elastomer Ingredient

These elastomers are produced, for example, by the following methods.

(i) Production of Ethylene/α-Olefin Copolymer Rubber

An ethylene/α-olefin copolymer rubber can be produced through polymerization using a Ziegler catalyst comprising, e.g., a titanium compound such as a titanium halide, and an organoaluminum/magnesium complex such as an alkylaluminum/magnesium complex or alkylalkoxyaluminum/magnesium complex, an alkylaluminum or alkylaluminum chloride as well as using the metallocene catalyst described in, e.g., International Publication WO 9104257. The polymerization can be conducted by production processes such as, e.g., the vapor-phase fluidized-bed method, solution method, and slurry method.

(ii) Production of Hydrogenated Block Copolymers (SEBS, SEPS)

These triblock copolymers can be produced by the general anionic living polymerization method. An SEBS can be produced by a process comprising successively polymerizing styrene, butadiene, and styrene to produce a triblock copolymer and then hydrogenating the copolymer or by a process comprising first producing a styrene/butadiene diblock copolymer, converting the copolymer into a triblock copolymer with a coupling agent, and then hydrogenating the triblock copolymer. An SEPS can be produced by using isoprene in place of the butadiene in either of these processes.

(3) Properties of Elastomer

The elastomer for use in the invention has a melt flow rate (MFR; 230° C., 2.16 kg load) of from 0.5 to 150 g/10 min, preferably from 0.7 to 100 g/10 min, more preferably from 0.7 to 80 g/10 min. In case where the MFR of the elastomer is lower than the lower limit, it gives insufficient flowability. On the other hand, MFR thereof exceeding the upper limit result in molded objects having a poor appearance.

(4) Proportion of Elastomer

The amount of the elastomer ingredient (A) according to the invention incorporated in the masterbatch of the invention should be from 10 to 60 parts by weight and is preferably from 20 to 50 parts by weight. In case where the incorporation amount thereof exceeds the upper limit, a composite material obtained by blending the masterbatch gives molded objects having a reduced flexural rigidity. In case where the incorporation amount thereof is smaller than the lower limit, a composite material obtained by blending the masterbatch gives molded objects which have a poor appearance due to poor dispersion.

2. Talc (Ingredient (B))

The talc, ingredient (B), for use in the high-concentration talc masterbatch of the invention is used for the purposes of efficiently reducing the degree of shrinkage and bringing about a satisfactory appearance while preventing flexural rigidity from decreasing.

(1) Properties of Talc

The talc contained in the masterbatch of the invention has an average particle diameter of from 1 to 15 μm, preferably from 2 to 10 μm. Use of talc having an average particle diameter exceeding the upper limit results in a reduced flexural modulus. On the other hand, talc having an average particle diameter smaller than the lower limit tends to have poor dispersibility.

Values of the average particle diameter can be determined as the particle diameter value for the 50 wt % cumulation read from a cumulative particle size distribution curve obtained by the laser diffraction method (with, e.g., LA920W, manufactured by Horiba Ltd.) or by the light transmission method based on liquid layer sedimentation (with, e.g., Type CP, manufactured by Shimadzu Corp.). In the invention, the former method was used to obtain the curve.

The talc can be obtained by mechanically pulverizing a naturally yielded talc mineral and subjecting the powder to precision classification. A talc powder obtained through rough classification may be further classified.

For the mechanical pulverization, use can be made of crushing or grinding machines such as, e.g., a jaw crusher, hammer crusher, roll crusher, screen mill, jet grinder, colloid mill, roller mill, and oscillating mill.

The talc thus pulverized is subjected to wet or dry classification once or repeatedly in order to obtain a powder having an average particle diameter regulated to a value within the range specified in the invention. For the classification, use may be made of an apparatus such as, e.g., a cyclone, cyclone air separator, microseparator, or sharp-cut separator. In producing the talc for use in the invention, talc particles which have been pulverized to a specific particle diameter are preferably classified with a sharp-cut separator in order to obtain talc particles of a specific size.

The talc for use in the invention may be one which has undergone surface treatment with, e.g., any of various organic titanate coupling agents, organic silane coupling agents, modified polyolefins by grafting an unsaturated carboxylic acid or anhydride thereof, fatty acids, metal salts of fatty acids, and fatty acid esters for the purpose of improving adhesion to the elastomer or dispersibility.

(2) Proportion

The amount of the talc incorporated in the masterbatch of the invention should be from 40 to 90 parts by weight and is preferably from 50 to 80 parts by weight.

In case where the incorporation amount of the talc is smaller than the lower limit, a composite material obtained by blending the masterbatch gives molded objects having an insufficient flexural modulus. In case where the incorporation amount thereof exceeds the upper limit, a composite material obtained by blending the masterbatch gives molded objects having an impaired appearance.

3. Metal Soap (Ingredient (C))

(1) Metal Soap Ingredient

The metal soap ingredient (ingredient (C)) for use in the high-concentration masterbatch of the invention is used for the purposes of preventing talc aggregation and bringing about a satisfactory appearance and satisfactory properties.

Examples of the metal soap ingredient include compounds represented by the formula:

$(RCOO)_n X$ wherein R is a hydrocarbon residue having 10 to 40 carbon atoms; X is a metal selected from Li, Na, K, Mg, Zn, Ca, Ba, and Al; and n is 1, 2, or 3.

Specific examples thereof include lithium stearate, sodium stearate, magnesium stearate, zinc stearate, calcium stearate, and aluminum stearate and the corresponding metal laurates, behenates, montanates, and hydroxystearates. Especially preferred metal soaps among these metal salts from the standpoints of performance and availability are lithium stearate, magnesium stearate, zinc stearate, calcium stearate, aluminum stearate, magnesium behenate, zinc behenate, and calcium behenate.

These metal salts can be produced by a synthesis method comprising reacting a carboxylic acid compound with a metal hydroxide, washing the reaction product with water, and then dehydrating and drying it (double decomposition method) or by a method in which the reactants are directly reacted without using water (direct method).

(2) Proportion

The incorporation amount of the metal soap ingredient should be from 0.01 to 5 parts by weight, and is preferably from 0.5 to 3 parts by weight, more preferably from 0.8 to 2.5 parts by weight, per 100 parts by weight of the sum of ingredients (A) and (B) in the masterbatch of the invention.

In case where the incorporation amount of the metal soap ingredient is smaller than the lower limit, a composite material obtained by blending the masterbatch gives molded objects having a reduced flexural modulus. On the other hand, even when the incorporation amount thereof exceeds the upper limit, the effect of metal soap incorporation cannot be enhanced anymore, resulting in poor profitability.

4. Additional Ingredients (Optional Ingredients)

Besides the essential ingredients (A) to (C) described above, additional ingredients (optional ingredients) can be added to the masterbatch of the invention in such amounts as not to considerably impair the effects of the invention.

Examples of such additional ingredients (optional ingredients) include antioxidants such as phenolic compounds and phosphorus compounds, weathering stabilizers such as hindered amines, benzophenone compounds, and benzotriazole compounds, nucleating agents such as organoaluminum compounds and organophosphorus compounds, colorants such as quinacridone, perylene, phthalocyanine, titanium oxide, carbon black, azo pigments, red iron oxide, and ultramarine, filler ingredients such as fibrous potassium titanate, fibrous magnesium oxysulfate, fibrous aluminum borate, whiskers of, e.g., calcium carbonate, carbon fibers, and glass fibers, and polymeric ingredients such as high-density polyethylene, low-density polyethylene, propylene homopolymer, and propylene/ethylene block copolymers.

[II] Masterbatch (1) Properties

The high-concentration masterbatch of the invention can be used as a masterbatch for shrinkage control. When dry-blended with a thermoplastic resin composition whose shrinkage is to be reduced, the masterbatch preferably satisfies the following. The coefficient of decrease in shrinkage degree (K) per part by weight of the masterbatch (MB) added per 100 parts by weight of a base material is $1/10,000$ or higher, preferably $4/10,000$ or higher, and the coefficient of change in flexural modulus (L) per part by weight of the masterbatch (MB) added per 100 parts by weight of the base material is $-50$ or higher, preferably $+10$ or higher, the coefficients K and L being respectively determined by the following equations:

$$K=(\text{decrease in shrinkage degree})/(\text{MB addition amount, parts by weight})$$

$$L=[(\text{flexural modulus after MB addition})-(\text{flexural modulus before MB addition})]/(\text{MB addition amount, parts by weight}).$$

[III] Process for Producing Masterbatch (1) Kneading

The high-concentration talc masterbatch of the invention for use as a masterbatch for shrinkage control can be obtained by evenly mixing and kneading the constituent ingredients described above. Methods for the mixing and kneading are not particularly limited. For example, the masterbatch is produced by a general method in which the ingredients are dry-blended by means of a mixer such as a Henschel mixer or tumbler and the mixture is kneaded with an extruder, Banbury mixer, roll mill, Brabender Plastograph, kneader, or the like at a temperature of from 100 to 200° C. An especially preferred kneading apparatus among these is an extruder, in particular, a twin-screw extruder.

(2) Molding

The high-concentration talc masterbatch of the invention for use as a masterbatch for shrinkage control is dry-blended with a thermoplastic resin composition whose shrinkage is to be reduced, and the resultant mixture is subjected to molding. Methods for the molding are not particularly limited, and molding techniques generally employed in the field of synthetic resins can be used, such as injection molding, injection compression molding, and blow molding. However, injection molding is suitable in view of the resultant effects of the invention.

(3) Applications

Since the masterbatch of the invention is a material which has or brings about the performances described above, it can be dry-blended with a thermoplastic resin composition whose shrinkage is to be reduced, before the resultant mixture is molded. The masterbatch is preferably used in applications such as injection-molded objects including exterior or interior, automotive parts, in particular, bumpers, side protectors, over fenders, instrument panels, door trims, pillar trims, console boxes, and the like.

The invention will be explained below in detail by reference to Examples.

The following methods of measurement and the following raw materials were used in the Examples.

1. Methods of Measurement (1) MFR: Measurement was made in accordance with JIS K7210 at 230° C. and a load of 2.16 kg.

(2) Flexural modulus: Measurement was made in accordance with JIS K7203 at 23° C. and a bending rate of 2 mm/min.

(3) Degree of thermal shrinkage: A sheet having dimensions of 120 mm by 120 mm by 3 mm (thickness) was molded, subsequently annealed by heating at 100° C. for 30 minutes, and then examined for the degree of thermal shrinkage.

(4) Appearance: A sheet having dimensions of 120 mm by 120 mm by 3 mm (thickness) was molded, and the appearance of the sheet was visually examined and judged based on the following criteria.

○: having no appearance defect.

X: having an appearance defect, e.g., unevenness of color, a granular structure, etc.

2. Raw Materials

The elastomer ingredients (A) and talc ingredients (B) used in the Examples and Comparative Examples are shown in Tables 1 and 2.

TABLE 1

| Ethylene Copolymer Elastomer Ingredient (A) | | | |
|---|---|---|---|
| Kind | MFR (g/10 min) | Density (g/cm$^3$) | Comonomer(s) |
| Elastomer 1 | 10 | 0.970 | 1-octene |
| Elastomer 2 | 7 | 0.960 | 1-butene |
| Elastomer 3 | 6 | 0.970 | propylene |
| Elastomer 4 | 40 | 0.970 | 1-octene |
| Elastomer 5 | 0.4 | 0.965 | propylene•diene |

TABLE 2

| Talc Ingredient (B) | |
|---|---|
| Kind | Average particle diameter ($\mu$m) |
| Talc 1 | 8 |
| Talc 2 | 19 |

EXAMPLE 1

(1) Production of Masterbatch

Forty parts by weight of an ethylene/1-octene random copolymer rubber having an MFR of 10 g/10 min (trade name, Engage EG8200; manufactured by Du Pont-Dow Corp.) was mixed with 60 parts by weight of talc having an average particle diameter of 8 $\mu$m and 1.6 parts by weight of magnesium stearate. Thereto were added 0.10 part by weight of tetrakis[methylene-3-(3',5'-di-t-butyl-4'-hydroxyphenyl) propionate]methane (trade name, IRGANOX 1010; manufactured by Ciba-Geigy Ltd.) and 0.05 parts by weight of tris(2,4-di-t-butylphenyl) phosphate (trade name, IRGAFOS 168; manufactured by Ciba-Geigy Ltd.) as antioxidants. The ingredients were evenly mixed together by means of a Henschel mixer and then kneaded with a twin-screw kneader (HTM65, manufactured by Ipek Corp.) at a screw rotational speed of 250 rpm and at 160° C. The resultant mixture was granulated and pelletized to obtain a masterbatch (MB-1) for shrinkage control.

(2) Production of Base Composite

Sixty parts by weight of a polypropylene block copolymer having an MFR of 65 g/10 min and an ethylene content of 4% by weight was mixed with 30 parts by weight of an ethylene/octene random copolymer rubber (trade name, Engage EGB150; manufactured by Du Pont-Dow Corp.) and 10 parts by weight of talc having an average particle diameter of 8 Am. Thereto were added 0.10 part by weight of tetrakis[methylene-3-(3',5'-di-t-butyl-4'-hydroxyphenyl)propionate]methane (trade name, IRGANOX 1010; manufactured by Ciba-Geigy Ltd.) and 0.05 parts by weight of tris(2,4-di-t-butylphenyl) phosphite (trade name, IRGAFOS 168; manufactured by Ciba-Geigy Ltd.) as antioxidants and 0.5 parts by weight of a masterbatch for dark-gray coloring (trade name, PPRM9L3038; manufactured by Dainichiseika Color & Chemicals Mfg. Co., Ltd.). The ingredients were mixed together for 5 minutes by means of a Henschel mixer. The resultant mixture was kneaded at 210° C. with a twin-screw kneader (2FCM) manufactured by Kobe Steel, Ltd., and then pelletized to obtain a thermoplastic resin composition (base material 1). This base material 1 had a degree of thermal shrinkage of $9.3/1,000$ and a flexural modulus of 13,500 kg/cm$^2$.

(3) Test Piece Molding

Ten parts by weight of the masterbatch (MB-1) was blended with 100 parts by weight of the base composite (base material 1) by means of a tumbler. Using an injection molding machine having a mold clamping force of 170 t, the mixture was molded into sheet-form test pieces having dimensions of 120 mm by 120 mm by 3 mm (thickness) at a molding temperature of 220° C. and a back pressure of 10 kg/cm$^2$. In the test pieces obtained, the talc and pigment had been evenly dispersed, and no appearance defect such as, e.g., unevenness of color was observed. The test pieces were annealed by heating at 100° C. for 30 minutes and the degree of thermal shrinkage thereof was then measured. The coefficient of decrease in shrinkage degree (K) was calculated from the difference in the degree of thermal shrinkage between the base composite and the test pieces. Furthermore, JIS test pieces were molded in the same manner and were examined for flexural modulus. The coefficient of change in flexural modulus (L) was determined from the resultant increase in flexural modulus. The results obtained are shown in Table 4.

EXAMPLES 2 TO 7

The elastomer ingredients, talc ingredients, and metal soap ingredients shown in Tables 1 to 3 were used in each of proportions shown in Table 3 in the same manner as in Example 1 to obtain masterbatches MB-2 to MB-5, MB-7, and MB-10. These masterbatches each was blended with a base material in the proportion shown in Table 4 to obtain test pieces. The test pieces were examined for appearance, the degree of thermal shrinkage, and flexural modulus and for the coefficient of decrease in shrinkage degree (K) and the coefficient of change in flexural modulus (L) in the same manner as in Example 1. The results obtained are shown in Table 4.

TABLE 3

| | Elastomer Ingredient | | Talc Ingredient | | Metal Soap Ingredient | |
|---|---|---|---|---|---|---|
| | Kind | Parts by weight | Kind | Parts by weight | Kind | Parts by weight |
| MB-1 | elastomer 1 | 40 | talc 1 | 60 | magnesium stearate | 1.6 |
| MB-2 | elastomer 2 | 40 | talc 1 | 60 | magnesium stearate | 1.6 |
| MB-3 | elastomer 3 | 40 | talc 1 | 60 | magnesium stearate | 1.6 |
| MB-4 | elastomer 4 | 40 | talc 1 | 60 | magnesium stearate | 1.6 |
| MB-5 | elastomer 1 | 40 | talc 1 | 60 | zinc stearate | 1.6 |
| MB-6 | elastomer 5 | 40 | talc 1 | 60 | magnesium stearate | 1.6 |
| MB-7 | elastomer 1 | 20 | talc 1 | 80 | magnesium stearate | 1.6 |
| MB-8 | elastomer 1 | 80 | talc 1 | 20 | magnesium stearate | 1.6 |
| MB-9 | elastomer 1 | 40 | talc 2 | 60 | magnesium stearate | 1.6 |
| MB-10 | elastomer 1 | 40 | talc 1 | 60 | zinc behenate | 1.6 |
| MB-11 | BC03B* | 40 | talc 1 | 60 | magnesium stearate | 1.6 |
| MB-12 | elastomer 1 | 40 | talc 1 | 60 | — | 0 |

*Propylene/ethylene block copolymer (MFR, 30 g/10 min; ethylene content, 3.5 wt %)

TABLE 4

| | Mixture | | | | Evaluation of Molded Object | | | |
|---|---|---|---|---|---|---|---|---|
| | Base resin | | Talc MB | | | Coefficient of decrease in shrinkage degree (K) ($\times 10^{-4}$) | Flexural modulus (kg/cm$^2$) | Coefficient of change in flexural modulus (L) | Appearance |
| | Kind | Parts by weight | Kind | Parts by weight | Degree of thermal shrinkage | | | | |
| Ex. 1 | base material 1 | 100 | MB-1 | 10 | 7.6/1000 | 1.7 | 14300 | 80 | ○ |
| Ex. 2 | base | 100 | MB-2 | 10 | 7.8/1000 | 1.5 | 14500 | 100 | ○ |

TABLE 4-continued

| | Mixture | | | | Evaluation of Molded Object | | | |
| --- | --- | --- | --- | --- | --- | --- | --- | --- |
| | Base resin | | Talc MB | | | Coefficient of decrease in shrinkage degree (K) (×10$^{-4}$) | Flexural modulus (kg/cm$^2$) | Coefficient of change in flexural modulus (L) | Appearance |
| | Kind | Parts by weight | Kind | Parts by weight | Degree of thermal shrinkage | | | | |
| Ex. 3 | base material 1 | 100 | MB-3 | 10 | 7.9/1000 | 1.4 | 14000 | 50 | ○ |
| Ex. 4 | base material 1 | 100 | MB-4 | 10 | 7.4/1000 | 1.9 | 13800 | 30 | ○ |
| Ex. 5 | base material 1 | 100 | MB-7 | 10 | 7.7/1000 | 1.6 | 15800 | 230 | ○ |
| Ex. 6 | base material 1 | 100 | MB-10 | 10 | 7.6/1000 | 1.7 | 14400 | 90 | ○ |
| Ex. 7 | base material 1 | 100 | MB-5 | 10 | 7.5/1000 | 1.8 | 14500 | 100 | ○ |

COMPARATIVE EXAMPLES 1 TO 5

The elastomer ingredients, talc ingredients, and metal soap ingredients shown in Tables 1 to 3 were used in each of proportions shown in Table 3 in the same manner as in Example 1 to obtain masterbatches MB-6, MB-8, MB-9, MB-11, and MB-12. These masterbatches each was blended with base material 1 in the proportion shown in Table5 to obtain test pieces. The test pieces were examined for appearance, the degree of thermal shrinkage, and flexural modulus and for the coefficient of decrease in shrinkage degree (K) and the coefficient of change in flexural modulus (L) in the same manner as in Example 1. The results obtained are shown in Table 5.

TABLE 5

| | | Mixture | | | | Evaluation of Molded Object | | | |
| --- | --- | --- | --- | --- | --- | --- | --- | --- | --- |
| | | Base resin | | Talc MB | | | Coefficient of decrease in shrinkage degree (K) (×10$^{-4}$) | Flexural modulus (kg/cm$^2$) | Coefficient of change in flexural modulus (L) | Appearance |
| | | Kind | Parts by weight | Kind | Parts by weight | Degree of thermal shrinkage | | | | |
| Comp. Ex. 1 | base material 1 | 100 | MB-6 | 10 | 8.1/1000 | 1.2 | 14700 | 120 | x |
| Comp. Ex. 2 | base material 1 | 100 | MB-8 | 10 | 7.9/1000 | 1.4 | 11300 | −220 | ○ |
| Comp. Ex. 3 | base material 1 | 100 | MB-11 | 10 | 8.7/1000 | 0.6 | 15300 | 180 | ○ |
| Comp. Ex. 4 | base material 1 | 100 | MB-12 | 10 | 7.9/1000 | 1.4 | 13100 | −40 | x |
| Comp. Ex. 5 | base material 1 | 100 | MB-9 | 10 | 8.0/1000 | 1.3 | 12700 | −80 | ○ |

The masterbatch of the invention can be dry-blended with a thermoplastic resin composition whose shrinkage is to be reduced, before the resultant mixture is molded. The masterbatch is suitable for use in applications such as injection-molded objects including exterior or interior, automotive parts, in particular, bumpers, side protectors, over fenders, instrument panels, door trims, pillar trims, console boxes, and the like.

What is claimed is:
1. A high-concentration talc masterbatch comprising:
 (A) 10 to 60 parts by weight of an elastomer having a melt flow rate of from 0.5 to 150 g/10 min;
 (B) 40 to 90 parts by weight of talc having an average particle diameter of from 1 to 15 μm; and
 (C) 0.01 to 5 parts by weight of a metal soap, based on 100 parts by weight of the sum of the ingredients (A) and (B).
2. The masterbatch according to claim 1, which is obtained by kneading and granulating the ingredients (A) to (C).
3. The masterbatch according to claim 1, wherein the metal soap (C) is a compound represented by the formula:

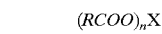

(RCOO)$_n$X wherein R is a hydrocarbon residue having 10 to 40 carbon atoms; X is a metal selected from Li, Na, K, Mg, Zn, Ca, Ba, and Al; and n is 1, 2, or 3.
4. The masterbatch according to claim 1, wherein the coefficient of decrease in shrinkage degree (K) per part by weight of the masterbatch (MB) added per 100 parts by weight of a base material is 1/10,000 or higher, and the coefficient of change in flexural modulus (L) per part by weight of the masterbatch (MB) added per 100 parts by weight of the base material is −50 or higher, said coefficients K and L being respectively determined by the following equations:

$$K = (\text{decrease in shrinkage degree})/(\text{MB addition amount, parts by weight})$$

$$L = [(\text{flexural modulus after MB addition}) - (\text{flexural modulus before MB addition})]/(\text{MB addition amount, parts by weight}).$$

5. The masterbatch according to claim 1, wherein said melt flow rate is 0.7 to 100 g/10 min.

6. The masterbatch according to claim 5, wherein said melt flow rate is 0.7 to 80 g/10 min.

7. The masterbatch according to claim 1, comprising from 20 to 50 parts by weight of said elastomer and from 50 to 80 parts by weight of said talc.

8. The masterbatch according to claim 1, wherein the talc has an average particle diameter of from 2 to 10 μm.

9. The masterbatch according to claim 1, wherein said talc has undergone surface treatment sufficient for improving adhesion to the elastomer or sufficient for improving dispersibility.

10. The masterbatch according to claim 1, comprising said soap in an amount of 0.5 to 3 parts by weight, per 100 parts by weight of the sum of the ingredients (A) and (B).

11. The masterbatch according to claim 10, comprising 0.8 to 2.5 parts by weight of said soap, per 100 parts by weight of the sum of the ingredients (A) and (B).

12. The masterbatch according to claim 4, wherein K is $4/10{,}000$ or higher.

13. The masterbatch according to claim 4, wherein L is +10 or higher.

* * * * *